US008911101B2

(12) United States Patent
Tsai

(10) Patent No.: US 8,911,101 B2
(45) **Date of Patent: *Dec. 16, 2014**

(54) LAVA LAMP DISPLAY DEVICE

(75) Inventor: Chien-Tsai Tsai, New Taipei (TW)

(73) Assignee: Su-Fang Ho, New Taipei (TW)

( * ) Notice: Subject to any disclaimer, the term of this patent is extended or adjusted under 35 U.S.C. 154(b) by 177 days.

This patent is subject to a terminal disclaimer.

(21) Appl. No.: 13/535,559

(22) Filed: Jun. 28, 2012

(65) Prior Publication Data

US 2014/0003035 A1 Jan. 2, 2014

(51) Int. Cl.

| | |
|---|---|
| ***F21V 33/00*** | (2006.01) |
| ***F21V 7/00*** | (2006.01) |
| ***F21V 7/07*** | (2006.01) |
| ***G06F 19/00*** | (2011.01) |

(52) U.S. Cl.

USPC ........... 362/101; 362/318; 362/806; 362/811; 362/297; 362/296.09; 40/406; 40/407

(58) Field of Classification Search

CPC ......... F21S 10/00; F21S 10/002; F21S 13/12; F21S 6/002; G09F 13/24; G09F 19/02; G09F 13/12; F21W 212/00; F21V 7/00; G06F 1/133605; Y10S 362/806

USPC ................... 362/96, 101, 318, 806, 811, 297, 362/296.09, 311.11; 40/406–408

See application file for complete search history.

(56) References Cited

U.S. PATENT DOCUMENTS

| | | | | | |
|---|---|---|---|---|---|
| 2,731,747 | A | * | 1/1956 | Hazelroth et al. | 40/406 |
| 3,501,227 | A | * | 3/1970 | Landen | 359/866 |
| 3,531,635 | A | * | 9/1970 | Hancock | 362/101 |
| 4,121,279 | A | * | 10/1978 | Whitesel | 362/297 |
| 4,139,955 | A | * | 2/1979 | Reiback | 40/427 |
| 4,462,789 | A | * | 7/1984 | Nakamura | 431/126 |
| 4,714,984 | A | * | 12/1987 | Spector | 362/101 |
| 5,262,929 | A | * | 11/1993 | Lenhart | 362/161 |
| D472,009 | S | * | 3/2003 | Eisenberg | D26/96 |
| 6,604,835 | B2 | * | 8/2003 | Zale | 362/101 |
| 7,163,315 | B2 | * | 1/2007 | Chang et al. | 362/245 |
| 2004/0075996 | A1 | * | 4/2004 | Lee | 362/101 |
| 2006/0215397 | A1 | * | 9/2006 | Lee | 362/161 |
| 2014/0003036 | A1 | * | 1/2014 | Ho | 362/101 |

* cited by examiner

*Primary Examiner* — Robert May
*Assistant Examiner* — Alexander Garlen
(74) *Attorney, Agent, or Firm* — Rosenberg, Klein & Lee

(57) ABSTRACT

A lava lamp display device comprising: a frame having a permeable vision window at a front surface thereof, and a lamp base and a projection light at a bottom of inner side thereof; a film-coated glass mounted on the vision window; a support bracket having at least one positioning hole thereon; a transparent bottle arranged in the positioning holes; and two reflection mirrors having a center serving as a reference to define the two symmetrical reflection mirrors, and both sides thereof inclined forward to form an angle θ being not parallel with the film-coated glass with 180° angle. After the filler of the transparent bottle is reflected repeatedly by the two reflection mirrors, the vision window shows shapes in an inward serial arrangement in the middle and unlimited extension on both sides, having effects of an illumination lamp device, an art decoration, and special visual in one unit.

7 Claims, 9 Drawing Sheets

LAVA LAMP DISPLAY DEVICE

BACKGROUND OF THE INVENTION

1. Field of the Invention

The invention relates to a lava lamp display device, and more particularly to a filler of a transparent bottle forms shapes being in an inward serial arrangement in the middle and unlimited extension and diffusion on both sides after the non-parallel reflection surfaces are reflected repeatedly.

2. Description of the Related Art

With reference to FIG. 1, U.S. Pat. No. 3,570,156 discloses a lava lamp display device 80 comprising: a glass vessel 81 having a bottom 82 arranged in a hollow conical metallic seating 83 and located on an electric light bulb 84. Moreover, the glass vessel 81 has two immiscible components such as liquid 85 and a paraffin 86 which has a higher density than the liquid 85 at room temperature and a lower density than the liquid 85 after heating. After the electric light bulb 84 is turned on, the paraffin 86 in the bottom 82 of the glass vessel 81 is heated and flows in the liquid 85. At the same time, the electric light bulb 84 projects the light in the glass vessel 81, forming a lighting effect and becoming decorations at home and office.

The lava lamp display device 80 has lighting effect only in a single glass 81. As a decoration, it seems too monotonous and lack of visual effects. Therefore, there is room for improvement.

SUMMARY OF THE INVENTION

It is a primary object of the present invention to provide a lava lamp display device, which provides a lava light in a frame with a vision window to form shapes being in an inward serial arrangement in the middle and unlimited extension and diffusion on both sides when a filler of the transparent bottle is reflected repeatedly by the non-parallel reflection surfaces for having effects of an illumination lamp device, an art decoration, and special visual in one unit.

In order to achieve the above object, the invention includes: a frame having an opening at a back side thereof, a permeable vision window at a middle of front side thereof, and a lamp base and a projection light at a bottom of inner side thereof; a film-coated glass mounted on the vision window, having a front side with light transmittancy and a reverse side with reflectivity, and the front side of film-coated glass facing toward an external part of the vision window; a support bracket arranged in the frame and having at least one positioning hole thereon; a transparent bottle corresponding to a height of the vision window is arranged in the positioning holes, having a bottom on a top of the projection light, and filled with a filler having two kinds of immiscible liquid; two pieces of reflection mirrors fixed on the support bracket, located at a rear side of the transparent bottle, and having reflection surfaces facing forward and a center serving as a reference to define the two pieces of symmetrical reflection mirrors and both sides of the two pieces of reflection mirrors inclined forward to form an angle (θ) being not parallel with the film-coated glass with 180° angle, and the angle (θ) is between 160° to 175°; after the filler of the transparent bottle is reflected repeatedly and cumulatively by the two pieces of reflection mirrors the vision window shows shapes being in an inward serial arrangement in the middle and unlimited extension and diffusion on both sides; and a cover plate arranged at the back opening of the frame.

Base on the features disclosed, the support bracket includes two standing plates, an upper transom plate and a lower transom plate arranged between the two standing plates; the two positioning holes are respectively arranged at a middle of the upper transom plate and the lower transom plate, and the positioning hole of the lower transom plate has a metal ferrule with an opening facing upward for placing the bottom of the transparent bottle.

Further, the upper transom plate and the lower transom plate of the support bracket have a rear side corresponding to the angle θ of the two pieces of reflection mirrors defines two symmetrical inclined faces to form a predetermined slope for fitting with the angle θ of the two pieces of reflection mirrors.

DETAILED DESCRIPTION OF THE PREFERRED EMBODIMENT

Figure 1:
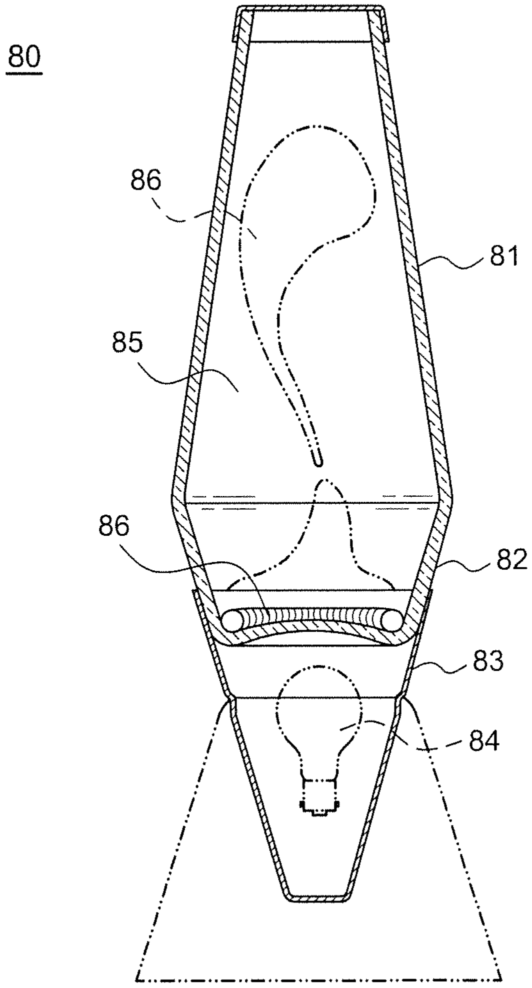
FIG.1 PRIOR ART
FIG. 1 is a sectional view of a conventional display device according to U.S. Pat. No. 3,570,156.

Referring to FIGS. 2 through 7, the preferred embodiment of a lava lamp display device in accordance with the present invention comprises: a frame 10, a film-coated glass 20, a support bracket 30, a transparent bottle 40, two pieces of reflection mirrors **50*a*, 50*b*, and a cover plate 60**.

The frame 10 includes an opening at a back side thereof, a permeable vision window 11 at a middle of front side thereof, and a lamp base 12 and a projection light 13 at a bottom of inner side thereof. In this embodiment, the frame 10 has a base 14 arranged at a bottom surface thereof. With the reference to FIGS. 8 and 9, the frame 10 may have an illuminating light source 70 and a lamp shade 71 arranged at a top surface thereof; such that, the present invention may be an illumination lamp.

The film-coated glass 20 is mounted on the vision window 11 and includes a front side with light transmittancy and a reverse side with reflectivity, which are physical characteristics of the film-coated glass 20 and thus will not be described in details here. In this embodiment, the front side of film-coated glass 20 faces toward an external part of the vision window 11.

Figure 2:
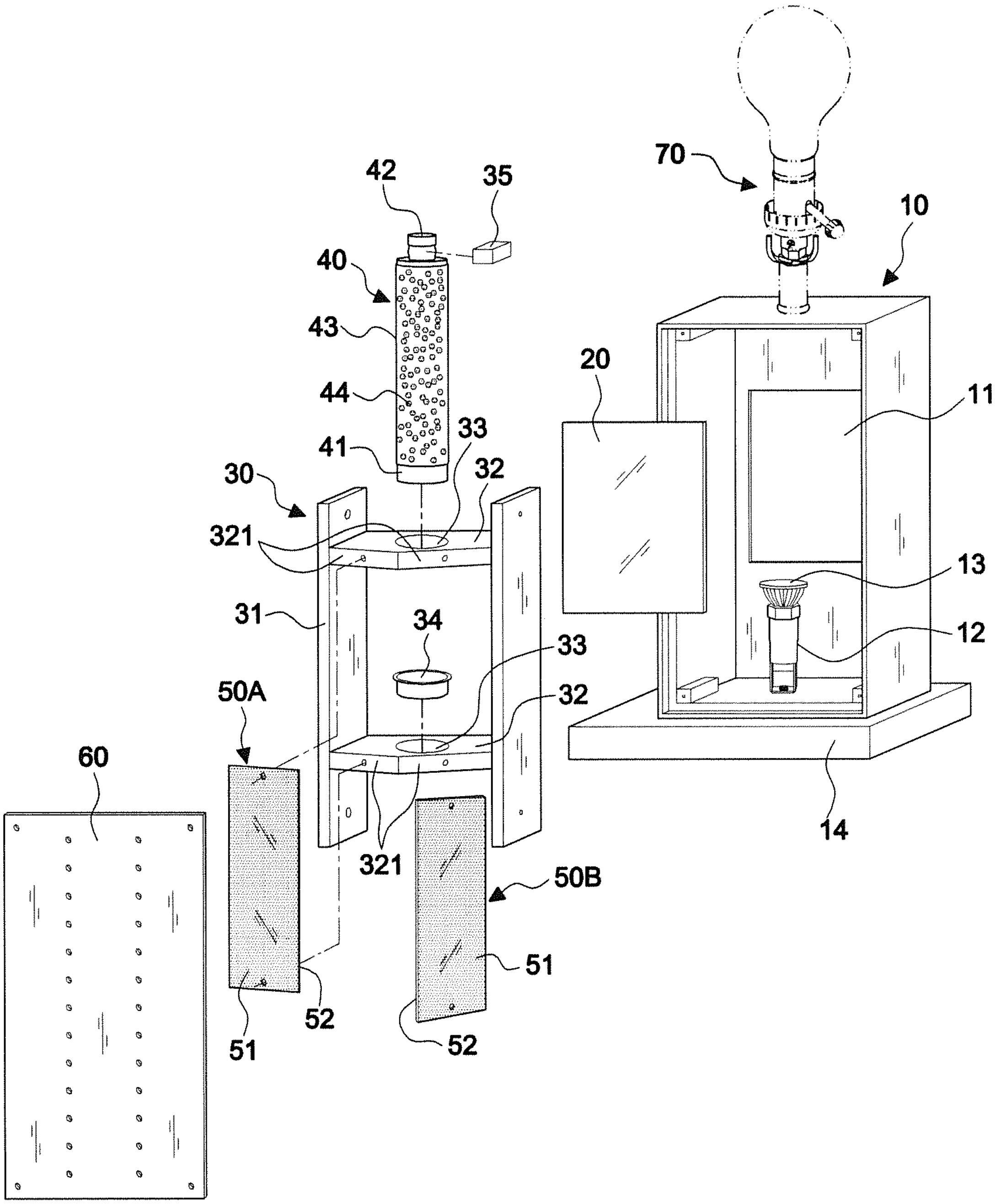
FIG. 2 is an exploded perspective view of the present invention, showing from a back of the present invention.
Figure 3:
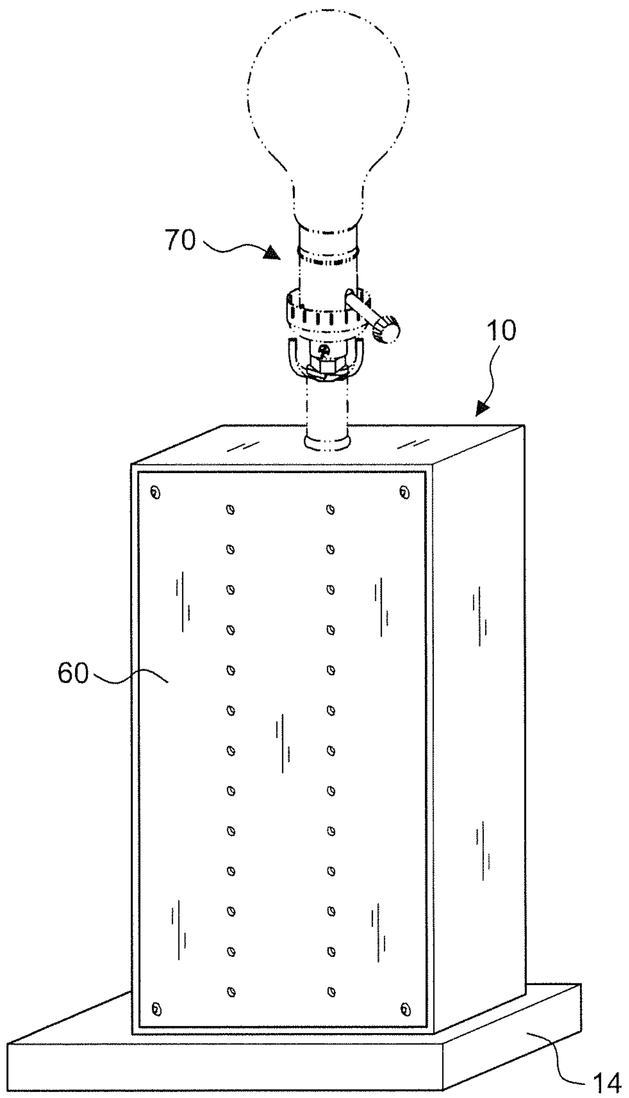
FIG. 3 is a perspective view of the present invention in a fully assembled state, showing from a right side of a back of the present invention.
Figure 4:
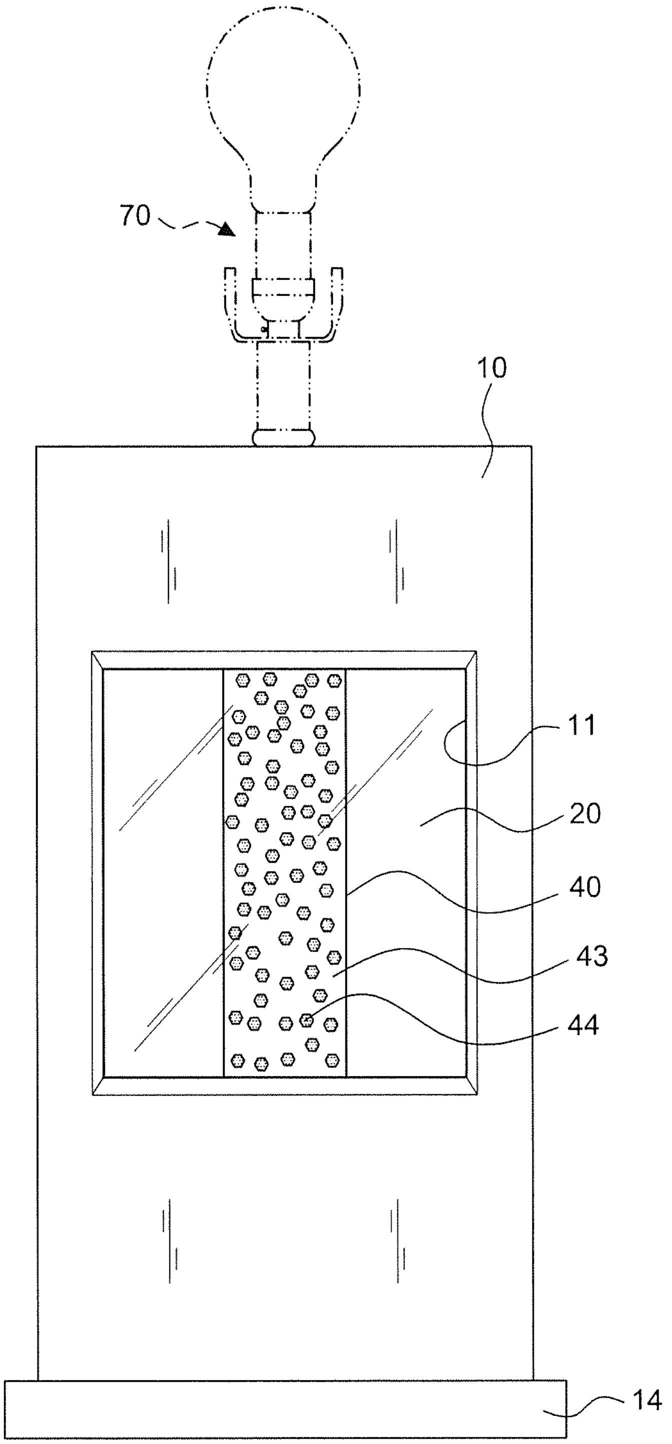
FIG. 4 is a front side schematic view of the present invention.
Figure 5:
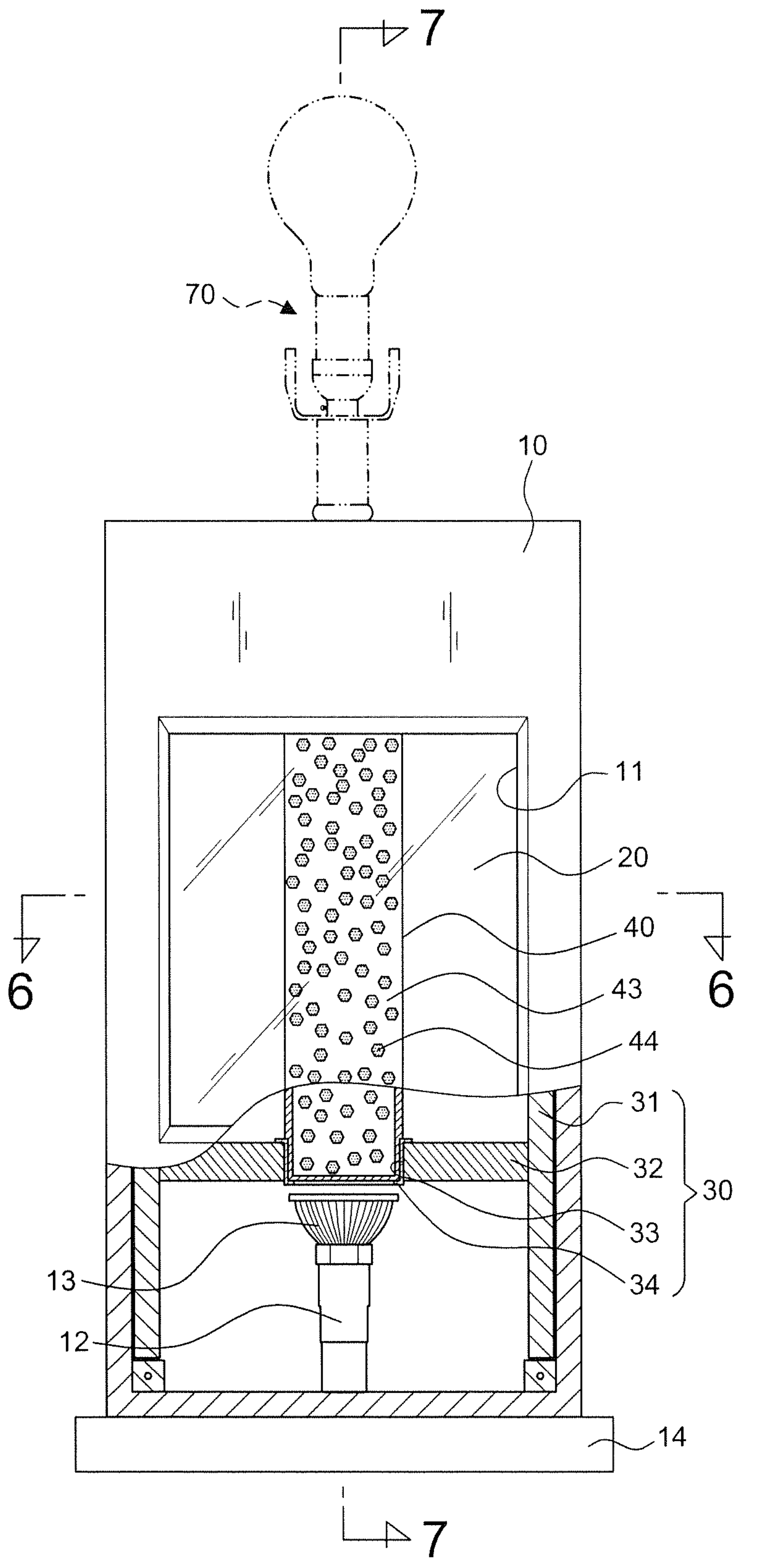
FIG. 5 is semi-sectional view of a front side of the present invention.

The support bracket 30 is arranged in the frame 10 and has at least one positioning hole 33 thereon. As shown in FIG. 2, the support bracket 30 includes two standing plates 31, an upper transom plate and a lower transom plate 32 are arranged between the two standing plates 31; the two positioning holes 33 are respectively arranged at a middle of the upper transom plate and the lower transom plate 32, and the positioning hole

33 of the lower transom plate 32 has a metal ferrule 34 with an opening facing upward for placing the bottom 41 of the transparent bottle 40.

The transparent bottle 40 corresponding to a height of the vision window 11 is arranged in the positioning holes 33 and has a bottom 41 on a top of the projection light 13. The transparent bottle 40 is filled with a filler 43 having two kinds of immiscible liquid; the filler 43 includes liquid, paraffin having a higher density than the liquid, or mineral oil. However, it is a prior art and thus will not be described in details here. In an applicable embodiment, the transparent bottle 40 further includes a plurality of paillettes 44 as shown in FIGS. 2 to 8.

The two pieces of reflection mirrors 50*a*, 50*b* fixed on the support bracket 30 are located at a rear side of the transparent bottle 40, and have reflection surfaces facing forward and a center serving as a reference to define the two pieces of symmetrical reflection mirrors 50*a*, 50*b*, and both sides of the two pieces of reflection mirrors 50*a*, 50*b* are inclined forward to form an angle θ being not parallel with the film-coated glass 20 with 180° angle, which the angle θ is between 160° to 175°. After the filler 43 of the transparent bottle 40 is reflected repeatedly and cumulatively by the two pieces of reflection mirrors 50*a*, 50*b*, the vision window 11 shows shapes being in an inward serial arrangement in the middle and unlimited extension and diffusion on both sides; and a cover plate 60 is arranged at the back opening of the frame 10.

Further, the upper transom plate and the lower transom plate 32 of the support bracket 30 have rear sides corresponding to the angle θ of the two pieces of reflection mirrors 50*a*, 50*b* define symmetrical inclined faces 321 to form a predetermined slope for fitting with the angle θ of the two pieces of reflection mirrors 50*a*, 50*b*.

Figure 7:
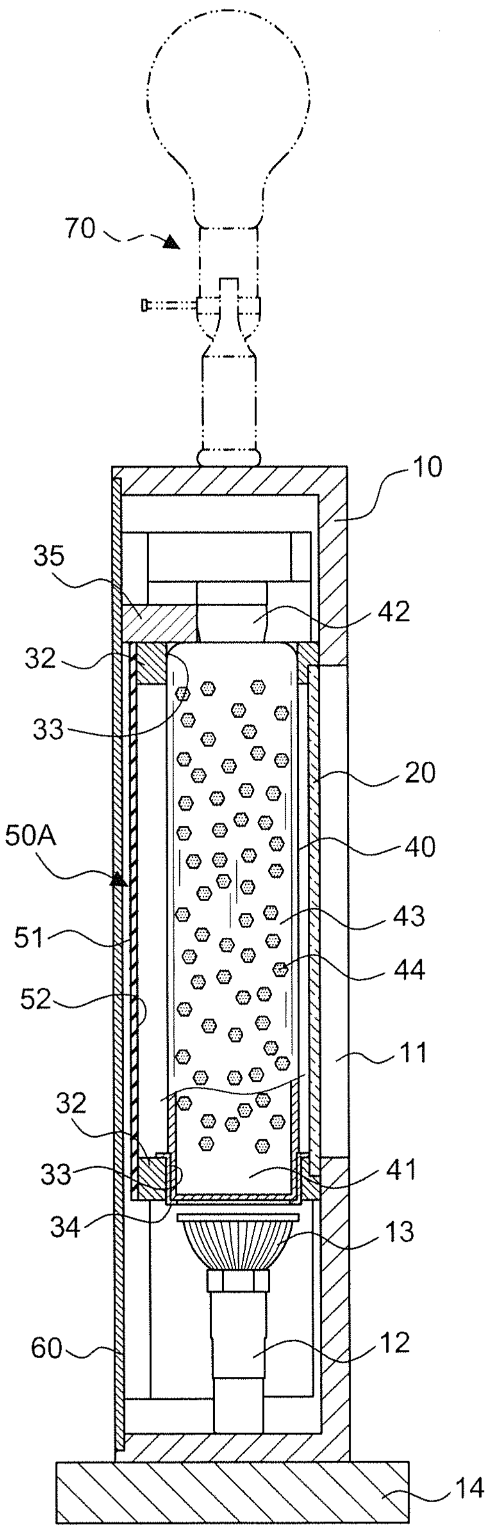
FIG. 7 is a cross-sectional view taken along the line 7-7 in FIG. 5.

In this embodiment as shown in FIG. 7, the transparent bottle 40 has an upper end 42 extended out of the positioning hole 33 and fixed by a fixed block 35.

Figure 6:
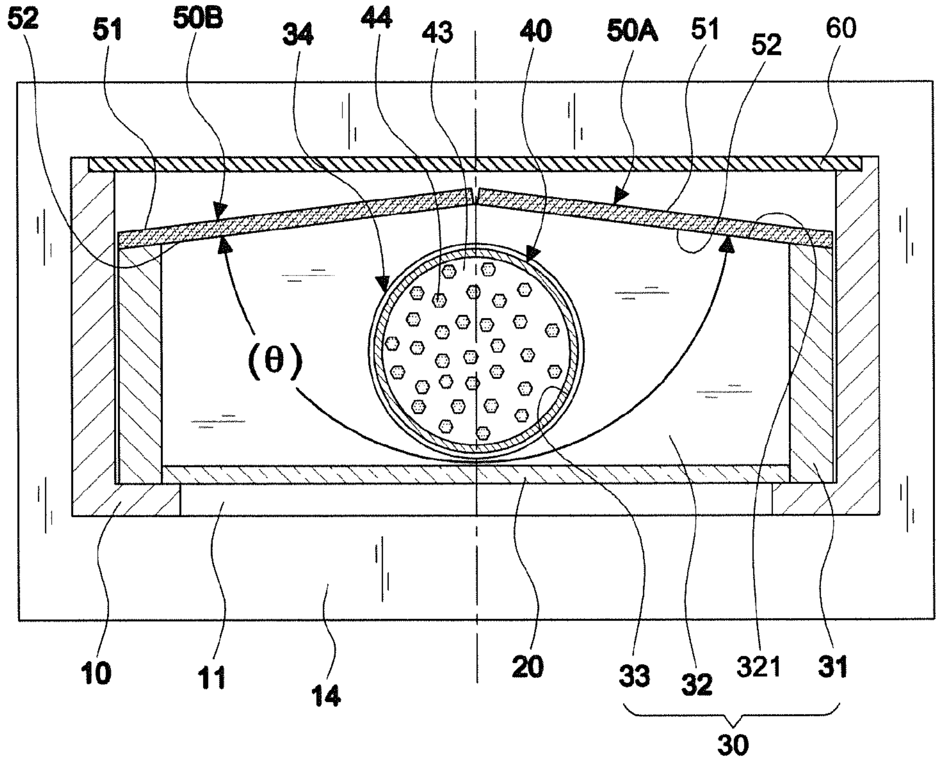
FIG. 6 is a cross-sectional view taken along the line 6-6 in FIG. 5.
Figure 8:
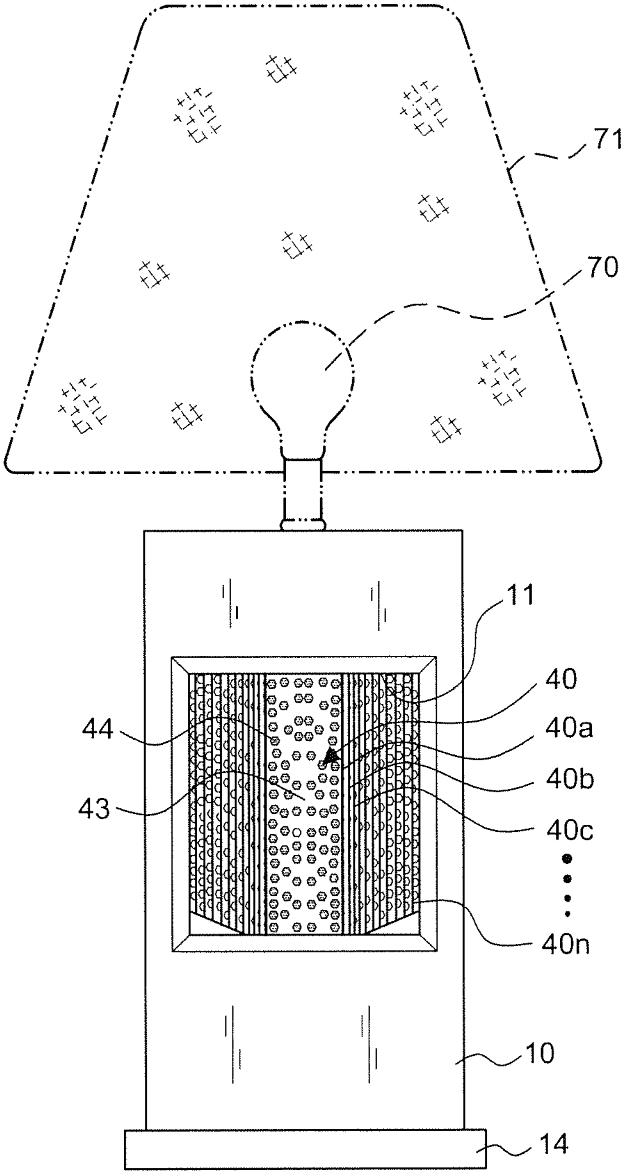
FIG. 8 is an application example view of the present invention.
Figure 9:
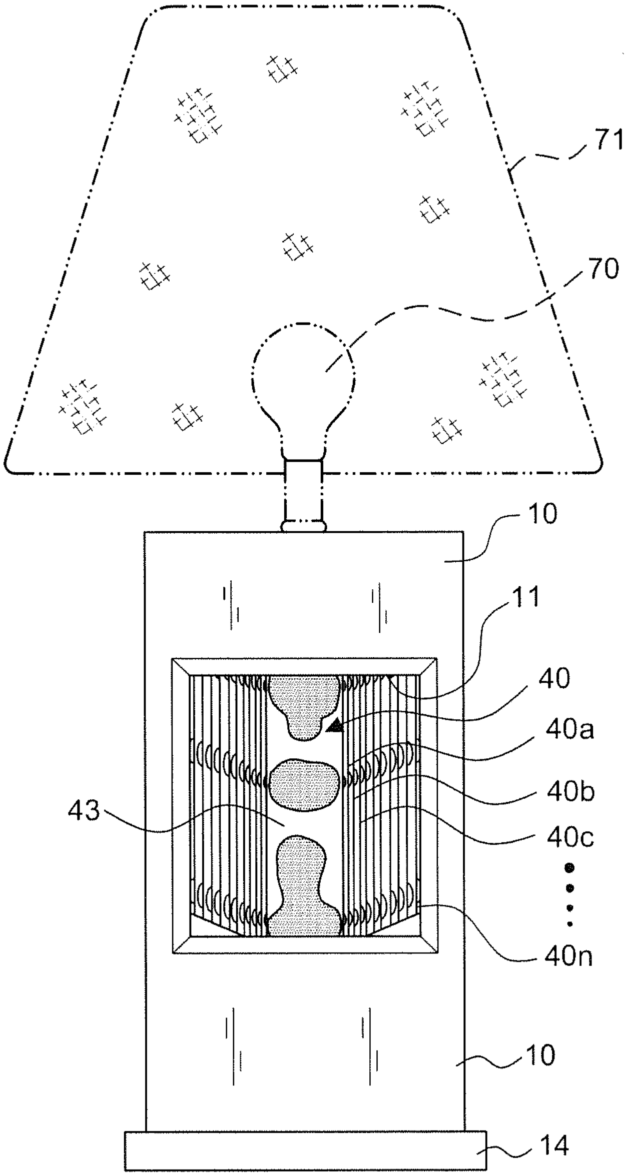
FIG. 9 is another application example view of the present invention.

FIG. 8 is a practical application view of the present invention, illustrating the filler 43 having the plurality of paillettes 44, whereas FIG. 9 shows a traditional lava lamp having filler 43 without paillettes. However, after arranging any kind of the transparent bottle 40 between the two pieces of reflection mirrors 50*a*, 50*b* and the film-coated glass 20 in accordance with the present invention as shown in FIG. 6, and turning on projection light 13, the filler 43 of the transparent bottle 40 is reflected repeatedly and cumulatively by the two pieces of reflection mirrors 50*a*, 50*b*, and the vision window 11 as shown in FIGS. 8 and 9 shows shapes in an inward serial arrangement in the middle and unlimited extension and diffusion on both sides, such as 40*a*, 40*b*, 40*c* . . . 40*n*; thus, the present invention has 3D visual perception, rather than the conventional lava lamp with signal vision. Therefore, the present invention has effects of an illumination lamp device, an art decoration, and special visual in one unit.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A lava lamp display device, comprising:

a frame having an opening at a back side thereof, a permeable vision window at a middle of a front side thereof, and a lamp base and a projection light at a bottom of an inner side thereof;

a film-coated glass mounted on the vision window, having a front side with light transmittancy and a reverse side with reflectivity, and the front side of the film-coated glass facing toward an external part of the vision window;

a support bracket arranged in the frame and having at least one positioning hole thereon;

a transparent bottle corresponding to a height of the vision window arranged in the positioning hole, having a bottom disposed above the projection light, and filled with a filler having a plurality of immiscible liquids;

two reflection mirrors fixed on the support bracket, located at a rear side of the transparent bottle, and having reflection surfaces facing forward and a center serving as a reference to define a substantially V-shaped configuration of symmetrical reflection mirrors visually cradling the transparent bottle when viewed through the vision window, wherein the two reflection mirrors are inclined forward to form an angle θ being not parallel with the film-coated glass with 180° angle, and the angle θ is between 160° to 175°; an image of the filler of the transparent bottle is being thereby reflected repeatedly and cumulatively by the two reflection mirrors, whereby shapes visible through the vision window appear in an inward serial arrangement in the middle with and unlimited extension on both sides; and a cover plate arranged at the back opening of the frame.

2. The lava lamp display device as claimed in claim 1, wherein the support bracket includes two positioning holes, two standing plates, an upper transom plate and a lower transom plate arranged between the two standing plates; the two positioning holes are respectively arranged at a middle of the upper transom plate and the lower transom plate, and the positioning hole of the lower transom plate has a metal ferrule with an opening facing upward for placing the bottom of the transparent bottle.

3. The lava lamp display device as claimed in claim 2, wherein the upper transom plate and the lower transom plate of the support bracket have a rear side corresponding to the angle θ of the two reflection mirrors defining two symmetrical inclined faces to form a predetermined slope for fitting with the angle θ of the two reflection mirrors.

4. The lava lamp display device as claimed in claim 1, wherein the filler of the transparent bottle includes a liquid, paraffin having a higher density than the liquid, or mineral oil.

5. The lava lamp display device as claimed in claim 4, wherein the transparent bottle further includes a plurality of paillettes.

6. The lava lamp display device as claimed in claim 1, wherein the transparent bottle has an upper end extending out of the positioning hole and fixed by a fixed block.

7. The lava lamp display device as claimed in claim 1, wherein the frame has a base arranged at a bottom surface thereof, and an illuminating light source and a lamp shade arranged at a top surface thereof.

* * * * *